United States Patent
Hall et al.

(10) Patent No.: US 10,050,342 B1
(45) Date of Patent: Aug. 14, 2018

(54) SELF DEPLOYING AXIAL DRIVE ACTUATOR

(71) Applicant: LOCKHEED MARTIN CORPORATION, Bethesda, MD (US)

(72) Inventors: Richard R. Hall, Baldwinsville, NY (US); Stanley M. Granat, Baldwinsville, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 953 days.

(21) Appl. No.: 14/482,599

(22) Filed: Sep. 10, 2014

(51) Int. Cl.
  *F16H 19/06* (2006.01)
  *H01Q 3/02* (2006.01)
  *G01S 13/02* (2006.01)

(52) U.S. Cl.
  CPC .......... *H01Q 3/02* (2013.01); *F16H 19/0618* (2013.01); *G01S 13/02* (2013.01)

(58) Field of Classification Search
  CPC ........ H01Q 3/02; H01Q 1/1235; G01S 13/02; F16H 19/06; F16H 19/0618; B66F 3/08; B66F 7/10; B66F 7/14; B66F 11/00; B66F 13/005; E04H 12/34; F16G 13/20; F16G 13/22
  USPC ............. 254/93 R, 134; 52/1, 114, 118, 121, 52/223.4, 223.5; 74/89.2, 424.73
  See application file for complete search history.

(56) References Cited

U.S. PATENT DOCUMENTS

| | | | |
|---|---|---|---|
| 2,173,685 A * | 9/1939 | Grassmann | B66F 11/00 254/1 |
| 2,946,556 A * | 7/1960 | Edgerton, Jr. | F16G 13/20 254/1 |
| 4,819,759 A | 4/1989 | Airhart | |
| 4,875,660 A | 10/1989 | Gagnon et al. | |
| 5,249,396 A * | 10/1993 | Zuse | E04H 12/185 52/108 |
| 5,322,004 A | 6/1994 | Sims | |
| 5,336,032 A * | 8/1994 | Pipes | B65G 1/045 198/778 |
| 6,547,216 B1 * | 4/2003 | Bouchard et al. | B66F 13/005 254/1 |
| 7,213,796 B2 * | 5/2007 | Laforest | B66F 11/00 254/1 |

(Continued)

FOREIGN PATENT DOCUMENTS

JP 4607772 B2 * 1/2011

OTHER PUBLICATIONS

Paco Spiral Lift Specification Sheet / I-Lock 75 Web Page, available at http://www.pacospiralift.com.

*Primary Examiner* — Victor L MacArthur
*Assistant Examiner* — Bobby Rushing, Jr.
(74) *Attorney, Agent, or Firm* — Howard IP Law Group

(57) ABSTRACT

An actuator device comprises a compact housing including an extendable corrugated column comprising: a horizontal helical band; a vertical sidewall band having a plurality of hinged segments; and a resilient retaining band; wherein the hinged segmented vertical band includes a first group of segments having tabs defined at longitudinal ends of the first group of segments, the tabs configured to overlap and engage an outer edge of the horizontal helical band, and a second set of segments positioned between adjacent tabbed segments of the first group of segments, the second set of segments configured to define corrugations between adjacent tabbed segments in the first group of segments.

12 Claims, 14 Drawing Sheets

(56) References Cited

U.S. PATENT DOCUMENTS

| 8,220,349 B2 | 7/2012 | Prichard |
| 2011/0126650 A1* | 6/2011 | Sorensen et al. ....... F16G 13/20 74/89 |
| 2011/0185647 A1 | 8/2011 | Diniz et al. |
| 2012/0097021 A1 | 8/2012 | Short et al. |

* cited by examiner

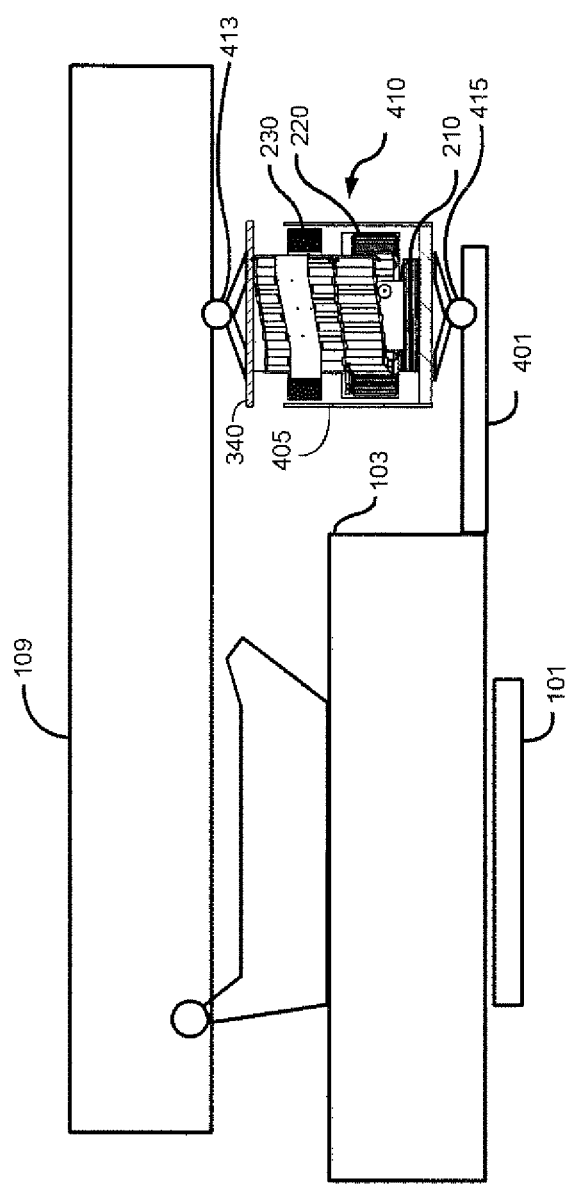

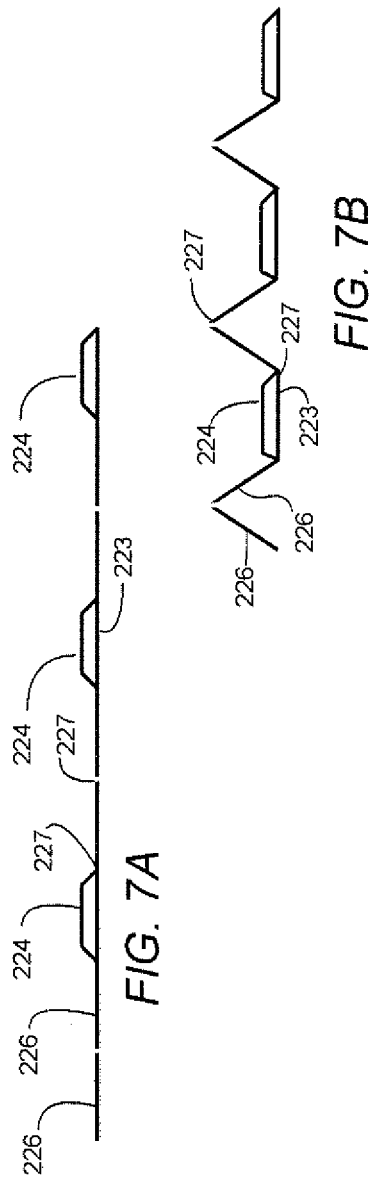

Comparison of Lateral Load on Different Configurations

| Design | Material | Wall Thickness (inch) | Area (in²) | Weight (lbs) | Load (lbs) | Load Direction | Deflection (inches) | Ratio |
|---|---|---|---|---|---|---|---|---|
| TPS-59 Backstay | Aluminum | 0.25 | 2250 | 225 | 1.0 | Lateral | 0.0028 | 1.75 |
| Circular Tube | Steel | 0.06 | 544 | 154 | 1.0 | Lateral | 0.0038 | 2.375 |
| Corrugated Tube | Steel | 0.06 | 1194 | 338 | 1.0 | Lateral | 0.0016 | 1 |

FIG. 12

SELF DEPLOYING AXIAL DRIVE ACTUATOR

FIELD OF THE INVENTION

This application relates generally to control systems, and more specifically to actuators for providing structural stiffness for compressive and/or tensile column loading.

SUMMARY

Embodiments of the present disclosure have application to lift systems for controlling movement and/or orientation of a given platform. For example, in the entertainment field, it may be desirable to raise or lower a section of a stage or platform to provide a given visual or artistic effect. Props or actors may be situated on a moveable platform and raised/lowered into or out of view. In the technology field, communications platforms such as mobile radar systems typically require lift and rotation of the antenna and accompanying communications equipment for deployment and/or operations.

Embodiments of the present disclosure provide an interlocking actuator design that supports not only compressive loads, but also resists tension and bending loads. Embodiments of the present disclosure may be made smaller than conventional designs for multiple actuator packing applications. An actuator according to embodiments of the disclosure may be used for lifting an antenna array, as leveling actuators for a radar system, and as a mast for communications equipment, by way of non-limiting example. Due to its smaller undeployed volume, the actuator embodied in the present disclosure can be oriented in a way that greatly reduces loads on radar array structures and enhances its versatility. This design can also be made lighter than existing devices which benefits radar transportability and its adaptability to other applications.

It is well known that hydraulic force may be used in a telescoping column where interlocking columnar segments are moved along a longitudinal axis to extend or retract to the telescoping column. One or more telescoping columns may be attached to the underside of a planar structure to provide support and lift to the planar structure. In such structures, there is a minimum segment length that must be accommodated in the space volume below the platform in order to house the column along with its control motors and systems. For ground or floor based lifts, the volume for housing the columns must be created by excavating below grade to accommodate the lift. Depending on the height needed, such excavation may be impractical, for example, in areas where the depth required to accommodate the lift is below the water table.

Lift devices may have similar size, weight and power (SWAP) restrictions. For example, in mobile radar applications, a large planar antenna or antenna array may be comprised of a large number of controllable exciter/receiver elements. These elements operate to emit and receive radiofrequency (RF) signals. The radar system including the antenna array may be mounted on a vehicle or vessel for transport to an operations site where the radar system is deployed. During operation, the radar antenna may be positioned at an angle or elevation to obtain a line of sight for a region being monitored or tracked. In addition, the antenna may be configured to rotate to provide a full view of the region in azimuth and elevation with respect to the bearing and attitude of the vehicle or vessel. To protect the antenna during transport and reduce drag, the antenna may be stowed in a folded position during transport. When arriving at the implementation site, the antenna may be lifted to the desired elevation angle and braced to maintain a desired (target) position. Bracing operations typically require manual intervention by the crew for deployment and break down of the bracing support structures.

In typical radar systems, linear actuators that pivot the antenna from the horizontal transport position to a deployed elevated orientation are implemented as hydraulic or ball screw lifting mechanisms. Once the antenna array has been raised, stay brace shafts (which require separate assembly and installation) are used to maintain the angle of inclination when exposed to forces from wind. The loads associated with the lift mechanisms create large stresses in the antenna array, particularly during the initial lift stage prior to installation of the stay braces. Furthermore, the lift mechanisms and brace shafts may add significant weight (e.g. hundreds to thousands of pounds) to the radar assembly. In addition, heavy systems are typically required in order to provide sufficient structural integrity against the forces exerted on the antenna during the deployment operation. Lift systems and methods that provide such systems with increased strength while maintaining relatively low weight and size requirements are desired.

BRIEF DESCRIPTION OF THE DRAWINGS

FIG. 4A is an elevation view of a radar system with a lift actuator according to an embodiment of the disclosure in a retracted position.

FIG. 7A is a plan view of the segmented vertical sidewall of FIG. 6A in a flattened or non-corrugated state for coiling and stowage according to an embodiment of the disclosure.

FIG. 7B is a plan view of the segmented vertical sidewall of FIG. 7A in a corrugated state for deployment as part of a spiral corrugated column according to an embodiment of the disclosure.

FIG. 12 is a table comparing deflection under lateral loads for different columnar configurations.

DETAILED DESCRIPTION

Figure 1:
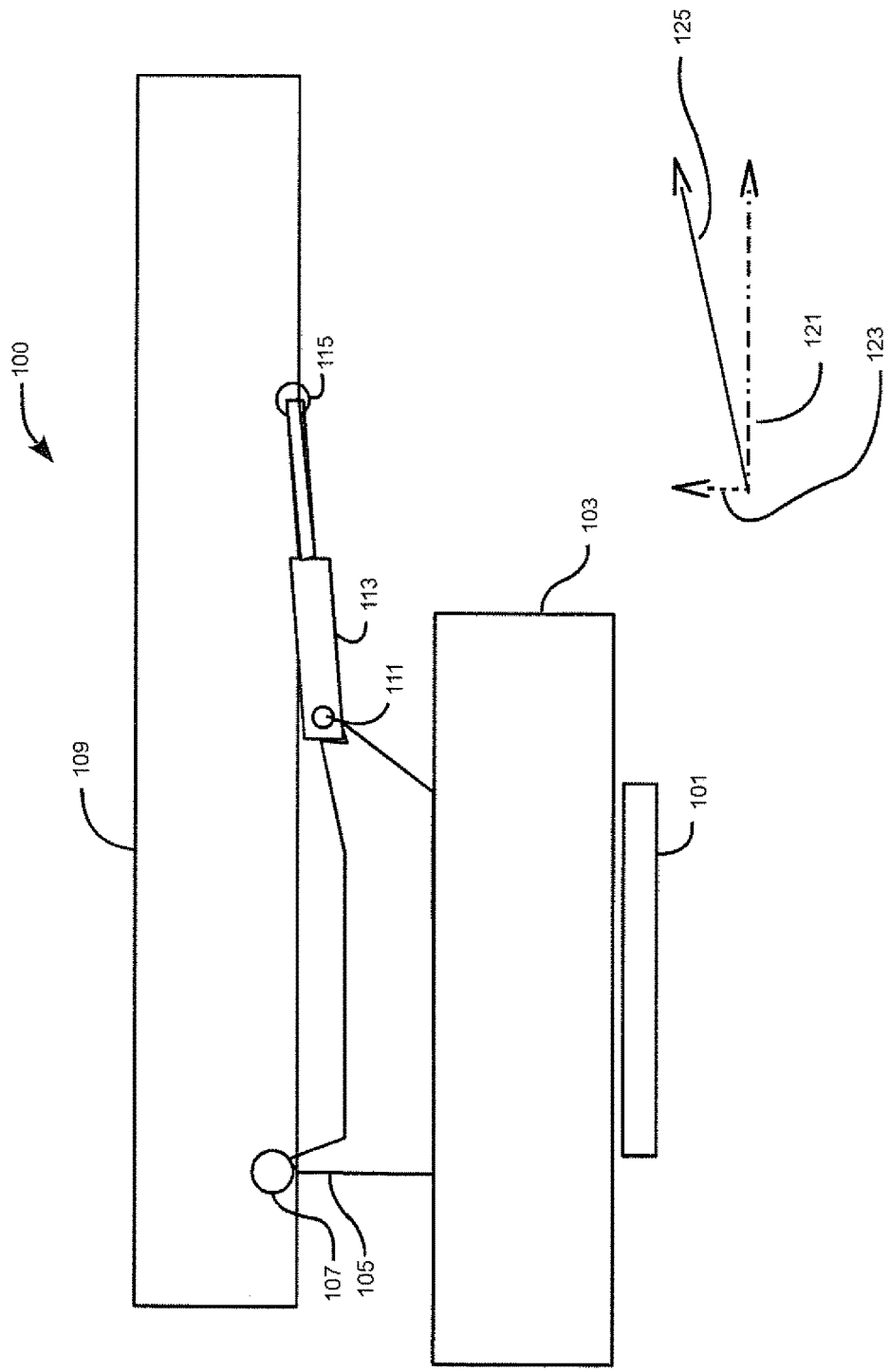
FIG. 1 is an elevation view of a radar system with a conventional linear actuating lift mechanism.

FIG. 1 is an illustration of a portable radar system 100 which may be mounted, for example on a vehicle or other platform. The radar system 100 rests on a swiveling platform 101 or mount which allows the radar antenna 109 to rotate. The radar antenna 109 (i.e. antenna array) may comprise a plurality of individual antenna elements, each element having an exciter for transmitting RE signals, and a receiver for receiving RE signals. A base 103 is secured to the swiveling platform 101 to support the radar system 100. A mount 105 is coupled to base 103 to attach the radar antenna array 109. The antenna 109 is pivotally mounted to the mount 105 by a pivot joint 107. The pivot joint 107 allows the antenna to be positioned at a selected angle relative to the base 103. For stowage during transport, the array antenna 109 may be positioned essentially horizontal as depicted in FIG. 1. During deployment, the antenna array may be raised from the base 103 up to an angle or elevation to obtain a line of sight for a region being monitored or tracked. To deploy the antenna array 109, a linear actuator 113 (e.g. a hydraulic actuator) is pivotally attached to mount 105 at pivot joint 111 at a first end and pivotally attached to the antenna array 109 at a second pivot joint 115 at its second end. Hydraulic actuators are commonly used, however, they tend to develop fluid leaks, thereby increasing maintenance time and costs. When used as a pair, the actuators must be synchronized to lift together which adds to the complexity of the system. As the linear actuator 113 is extended, a force is applied to the antenna array 109 to raise the array while pivoting the antenna array 109 about pivot joint 107. The extension of linear actuator 113 exerts a force component shown as vector 121 which represents a force component that stretches the antenna array 109, and a force component shown as vector 123 that serves to lift the antenna array 109. Because of the low angle of the stowed antenna 109, combined vector 125 is many times the force (vector 123) actually required to lift the antenna array 109. The excess force needed to lift the antenna array 109 in this fashion adds power and weight to the overall radar system design. For example, the antenna array 109 itself undergoes significant flexing forces, requiring designers to select sufficiently robust and heavy materials for fabricating the antenna array 109.

To address some of the disadvantages of hydraulic linear actuators, spiral lifts have been developed for providing vertical lifting. For example, in the theater arts, it is often desirable to provide a portion of the stage which may be raised and/or lowered relative to the main stage level. Spiral lifts are disposed beneath the adjustable section of stage to provide vertical lift. The spiral lifts extend a columnar support which is normal to a support level (e.g. ground level) and lift the stage segment such that the stage segment remains parallel to the support level. While the spiral lift is arranged with its lift column perpendicular to the ground, the load of the stage segment exerts a compressive force on the spiral lift column.

Conventional spiral lifts provide an adjustable lift columnar structure comprising two elements embodied as coiled bands when in an "undeployed" state. A compact housing holds the two coiled bands. The first band forms a helical horizontal band. A first end of the horizontal band is urged upward from the housing to cause the horizontal band to form a helical band having its major planar surfaces arranged substantially horizontally (parallel) with respect to the ground. When stored, the turns of the horizontal band lie atop one another in a stacked coil. A second vertical band is coiled in a spiral within the housing with its major planar surfaces arranged vertically with respect to the ground. As the vertical band is dispensed from the housing, the upper and lower edges of the vertical band engage the spaces between turns in the helix formed by the horizontal band to form the vertical walls of a cylindrical column. The compressive force applied by the stage segment presses down on the junctions of the horizontal and vertical bands. This in turn generates friction forces that hold the relative positioning of the horizontal and vertical bands. Conventional spiral lifts tend to work well for vertical compressive loads. However, if a non-compressive force is applied to conventional spiral lifts, the vertical bands tend to uncoil and disengage from the horizontal bands. This causes the column to collapse under its own weight when the lift column is not vertical, or under the influence of lateral forces such as wind when exposed to an outdoor environment.

According to an embodiment of the disclosure, an extendable spiral column is formed through the cooperation of at least two continuous bands. A first band is arranged in a helical coil defining annular turns of the helical coil. The annular turns of the helical coil may be stretched defining a space between successive annular turns. A segmented sidewall having a transverse dimension corresponding to the space formed between the annular turns of the first band is configured so as to occupy the space defined between successive turns. The segmented band includes hinged segments that may be arranged relative to one another to form a corrugated profile.

Figure 2A:
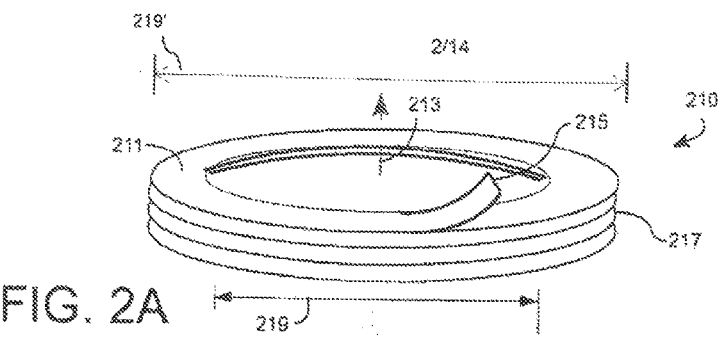
FIG. 2A is a perspective view of a horizontal helical band according to an embodiment of the disclosure.

FIG. 2A is a perspective view of a first continuous band useful as a component in forming an extendable spiral column according to an embodiment of the disclosure. The horizontal band 210 is shown in a stored or undeployed state, wherein the horizontal band 210 is stored as a stacked helical coil 211. In an undeployed state, the successive turns 217 of the helix 211 rest atop one another to allow the horizontal band 210 to be stored in a compact space, such as a compact housing. The turns of the helix 211 are formed as annular bands or rings, which are transversely perpendicular to the central axis 213 of the helix 211. The helix 211 has a first or upper end 215, which may be lifted away from the stacked coil allowing the turns 217 of the helix 211 to be separated and defining a space between successive turns of the helix 211. The annular turns 217 define a minimum inside diameter 219 of the horizontal band 210.

Figure 2B:
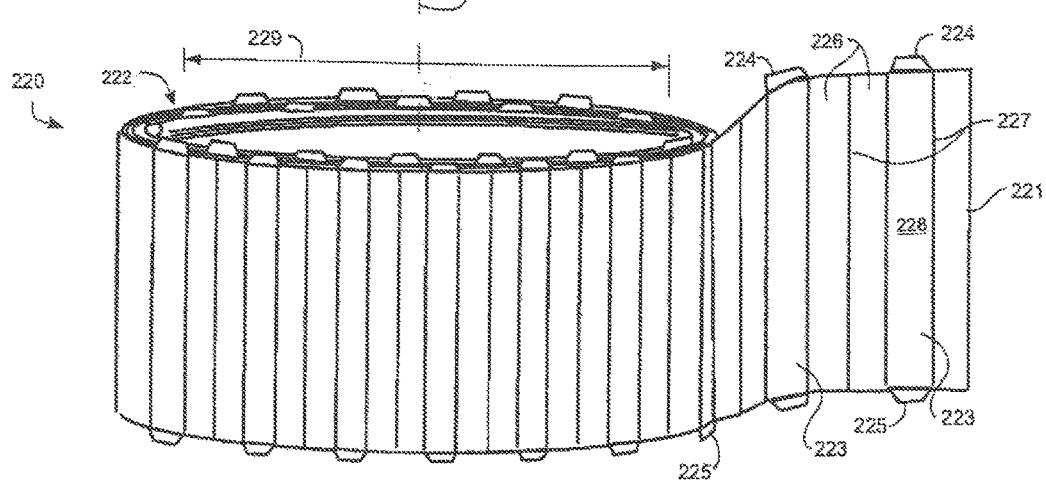
FIG. 2B is a perspective view of a segmented vertical band according to an embodiment of the disclosure.

FIG. 2B is a perspective view of a second continuous band useful as a component in forming an extendable spiral column according to an embodiment of the disclosure. As shown, the second band is implemented as a vertical segmented band 220. The segmented vertical band is comprised of a plurality of elongated segments 223, 226 that are connected via hinged edges 227. Tabbed segment 223 includes tabs 224, 225 that extend from the respective longitudinal ends of generally planar surface or face 228 of the tabbed segment 223. Between adjacent tabbed segments 223, a plurality of non-tabbed segments 226 are located such that the non-tabbed segments 226 and the face 228 of tabbed segments 223 are transversely parallel to the central axis 213. The tabbed segments 223 and non-tabbed segments 226 connect to define a vertical side wall 221 of the extendable spiral column formed in cooperation with the horizontal band 210 shown in FIG. 2A.

Segmented vertical band 220 is shown in FIG. 2B in a stored or non-deployed state in which the segmented vertical band 220 is wound into a spiral coil 222. The spiral coil 222 defines a minimum internal diameter 229, which is greater than the maximum outside diameter 219' of horizontal band 210. Thus, the end of segmented vertical band 220 may be wrapped around the outer radial diameter of the helix 211 formed by extending horizontal band 210. As described above, the successive turns 217 of horizontal band 210 may be separated to define a space therebetween. The space created between successive turns in horizontal band 210 correspond approximately to the height or transverse length of each major surface of non-tabbed segments 226 and the major surface or face 228 of the tabbed segments 223. To form an extendable spiral column, the face 228 of the tabbed segment 223 is positioned across the spaces created between the successive turns 217 of the horizontal band. The upper tabs 224 and lower tabs 225 of tabbed segment 223 overlap the radial outermost edges of the turns of the horizontal band 210. Non-tabbed segments 226 fit between the successive turns of the horizontal band 210 and are arranged at angles relative to one another via hinged edges 227. The non-tabbed segments 226 are urged inward radially from the outer edges of the successive turns of the horizontal band 210. The angled non-tabbed segments 226 create a corrugated profile in the vertical sidewall 221 created by the segmented vertical band 220. The tabbed segments 223 may be spaced from adjacent tabbed segments 223 such that as the segmented vertical band 220 is wrapped around the extended horizontal band 210 the upper tabs 224 of the tabbed segments 223 enmesh with the lower tabs 225 of tabbed segments 223 corresponding to an adjacent turn of the horizontal band 210. In this way, the upper and lower tabs 224, 225 of the tabbed segments 223 cause the vertical sidewalls associated with successive turns of the horizontal band 210 to interlock and define a stable spiral column.

Figure 2C:
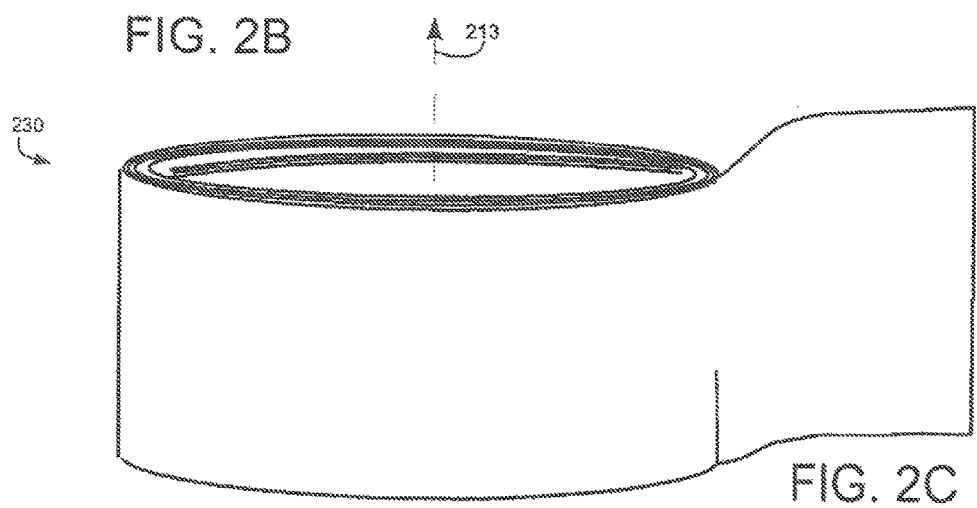
FIG. 2C is a perspective view of a retaining band according to an embodiment of the disclosure.

FIG. 2C is a perspective view of a third continuous band useful as a component in forming an extendable spiral column according to an embodiment of the disclosure. FIG. 2C shows a resilient vertical retaining band 230 which is transversely parallel to the central axis 213. Retaining band 230 may comprise a resilient material, which in an unstressed state exhibits a curvature defining a diameter less than or substantially equal to the outermost radial diameter of the horizontal band 210 and the vertical side wall which surrounds the successive turns of the horizontal band 210. The retaining band 230 may be stored as shown in FIG. 2C as a spiral coil and wrapped around the spiral column formed by the interaction of the horizontal band 210 and the segmented vertical band 220. The retaining band 230 may be fabricated from resilient materials such as a synthetic fiber (e.g. para-aramid synthetic fiber). It is understood that a strap or wire rope could also be used. The retaining band 230 exerts a radially inward force against the tabbed segments 223 at locations of the enmeshed top 224 and bottom 225 tabs, which overlap the edges of successive turns of the horizontal band 210. The retaining band 230 thereby follows the helical path defined by the radial outer edges of the horizontal band 210 and serves to hold the tabbed segments 223 securely to the outer edge of the helical band. The retaining band 230 provides additional stability to the extendable spiral column. The cooperation of horizontal band 210, segmented vertical band 220 and retaining band 230 provide a spiral column with superior strength both axially and radially.

The three bands shown in FIGS. 2A, 2B and 2C may be stored within a compact housing. A deployment mechanism may be employed to arrange horizontal band 210, segmented vertical band 220 and retaining band 230 relative to one another to form an extendable spiral column, which is extendable from an end of the compact housing. The extendable end of the spiral column may be attached to a moveable platform or member, which is connected to a point or platform being supported or acted upon by the extending spiral column.

Figure 3A:
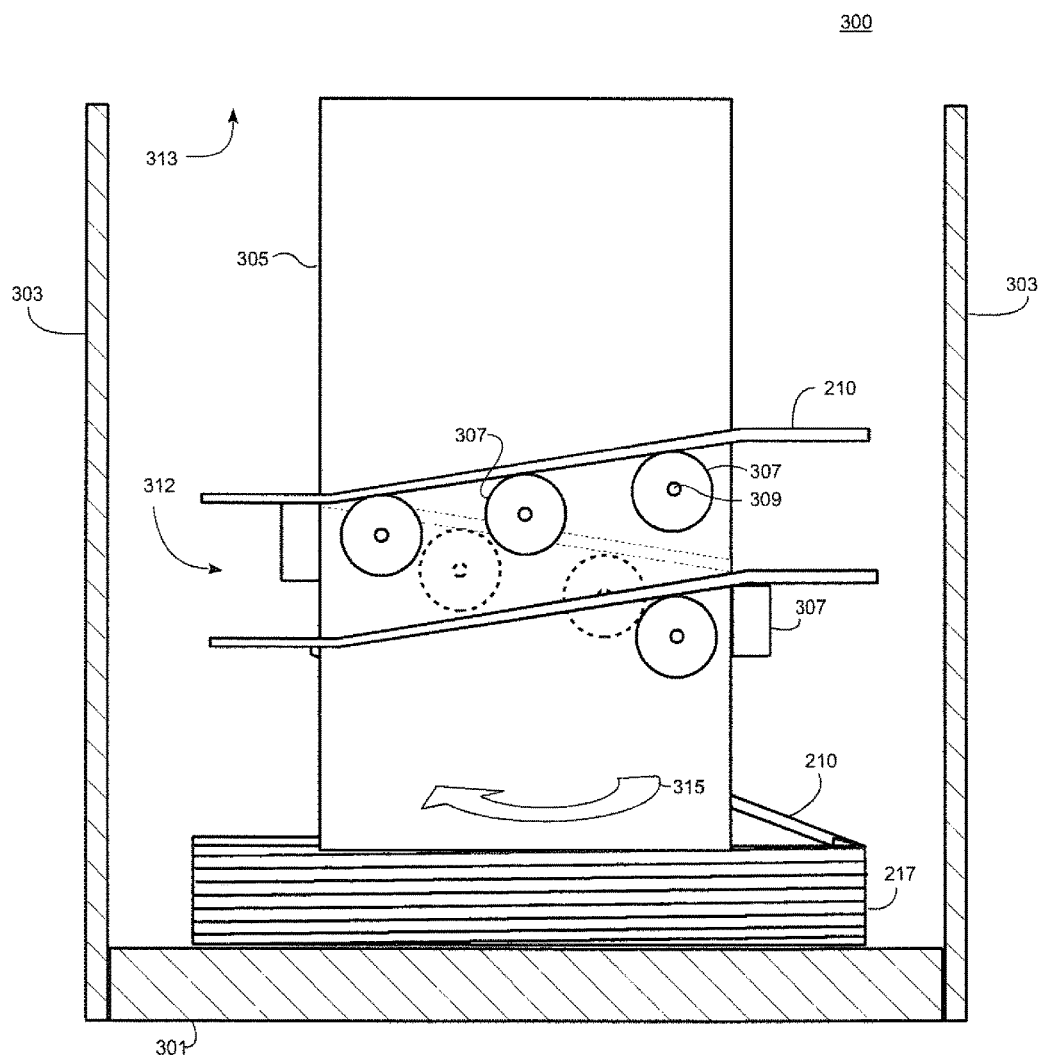
FIG. 3A is a partial elevation view of a deployment mechanism according to an embodiment of the disclosure.

FIG. 3A is a partial elevation view of a deployment mechanism 300 according to an embodiment of the disclosure. The deployment mechanism 300 includes a base 301 and sidewalls 303, which define a compact housing. A rotor 305 includes a cylindrical body that is rotatably mounted to base 301. The rotor 305 body has an outside diameter, which is less than the minimum radial diameter of the horizontal band 210. Thus, the horizontal band 210 may be stored as a stacked helical coil, resting on base 301. The stored horizontal band 210 surrounds the cylindrical body of rotor 305 at base 301. Rotor 305 is rotatable in direction 315 freely rotatable within the turns 217 of horizontal band 210 which remain stationary with respect to base 301. That is, the turns 217 of horizontal band 210 do not rotate relative to the housing base 301. A plurality of rollers 307 are disposed on the outer surface of the cylindrical body of rotor 305. Rollers 307 are rotatably connected to rotor 305 body by pins 309, which pass through the cylindrical body of the rotor 305 and may be secured using suitable attachment means. For example, a nut may secure the roller 307 via pin 309 to the rotor 305. The rollers 307 are arranged around the cylindrical surface of the rotor 305 such that the upper surfaces of the rollers 307 define an inclined path which circumscribes the outer surface of the cylindrical body of rotor 305. The horizontal band 210 is stretched and its successive turns are separated and arranged so that one turn of the helical horizontal band rests along the inclined path defined across the tops of the rollers 307. As rotor 305 rotates in direction 315, the rollers 307 lift successive turns 217 of horizontal band 210 along the inclined path. The inclined path defined by the tops of rollers 307 rotates relative to the successive turns 217 of the horizontal band 210 to create a void or space 312 between the successive turns 217. As the rotor 305 rotates, the turns of the stored horizontal band 210 are lifted to form a helix extending upward from base 301 toward top end 313 of the housing defined by sidewalls 303.

Figure 3B:
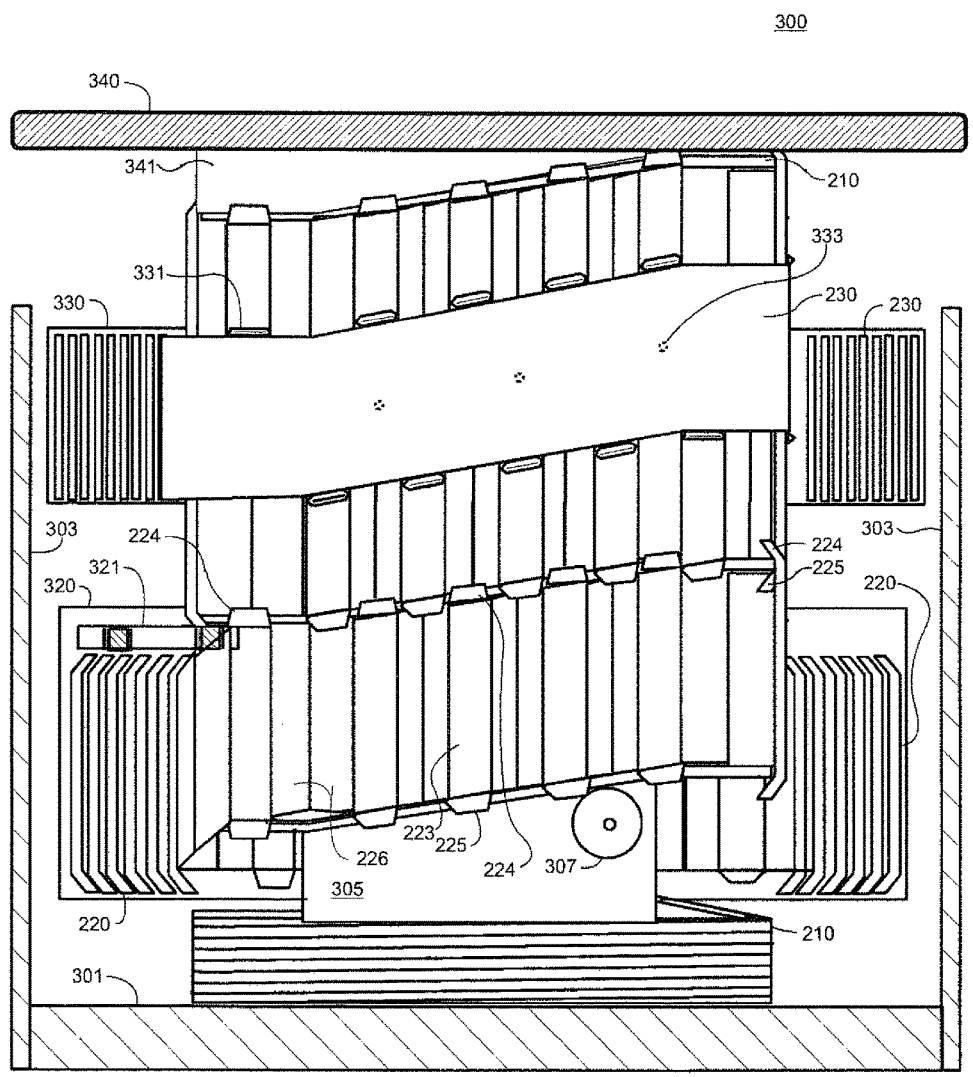
FIG. 3B is an elevation view of the deployment mechanism of FIG. 3A shown in greater detail.

FIG. 3B is an elevation view of the deployment mechanism 300 shown in FIG. 3A including additional details according to an embodiment of the disclosure. A compact housing is formed from base 301, sidewalls 303 and lid or upper platform 340. An end of horizontal band 210 may be attached to platform 340. A tapered region 341 is defined by the angle of incline in the helix from horizontal band 210, which may be filled with a sidewall, which defines a portion of the cylindrical sidewall of the extendable spiral column at the first turn of the horizontal band adjacent to platform 340. Horizontal band 210 is supported by rollers 307, which are disposed within the cylindrical wall of rotor 305. Annular retainer 320 is rotatably mounted and surrounds rotor 305. Retainer 320 is configured to hold segmented vertical band 220 when it is stored in a non-deployed state as a spiral coil. Retainer 320 is independently and freely rotatable relative to rotor 305 and is open along its inner diameter to allow the segmented vertical band 220 to uncoil and be inserted between successive turns of the horizontal band 210. As rotor 305 rotates successively lifting turns of the horizontal band 210, tabbed segments 223 are placed against the outer edges of the helix formed from horizontal band 210. Tabs 224, 225 overlap the edges of the horizontal band 210 and the major planar surface or face 228 (shown in FIG. 2B) of the tabbed segments 223 define vertical sidewalls of the extendable spiral column. As the segmented vertical band 220 is wrapped around the helix of the horizontal band 210, the upper tabs 224 of tabbed segments 223 enmesh with the lower tabs 225 of tabbed segments associated with the previous turn (the adjacent turn toward the top of FIG. 3B) of horizontal band 210. As rotor 305 rotates, the turns of horizontal band 210 are extended to create a space between successive turns. Segmented vertical band 220 is wrapped around the helix formed by horizontal band 210 through the rotation of rotor 305, forming an extendable spiral column with horizontal band 210, which extends out of the upper end of housing sidewalls 303. The top end of the extendable column may be attached to platform 340, which extends from the housing as the spiral column extends or deploys.

An additional annular housing or retainer 330 is positioned above the segmented vertical band 220 and contains retaining band 230 in a non-deployed state and stored as a spiral coil. Retainer 330 is freely rotatable about rotor 305 and allows the retaining band 230 to be uncoiled and dispensed from retainer 330. As the horizontal band 210 is lifted and the vertical band 220 is placed between separated turns of the horizontal band 210, the enmeshed tabs 224, 225 along each turn of the horizontal band are covered by retaining band 230 as the retaining band 230 is wrapped around the spiral column due to the relative movement of rotor 305. To aid in positioning the retaining band 230 at the edges of the horizontal band 210, tabbed segments 223 may be configured with embossed ridges 331 on their faces (228 shown in FIG. 2B) which guide the retaining band 230 into its proper position. In an alternative embodiment, the faces 228 of tabbed segments 223 may include small bumps or protuberances, which engage apertures 333 defined in the retaining band 230 material.

In one non-limiting example, and in order to conserve vertical space, the retainer 330 containing retaining band 230 may be arranged at the same vertical level relative to rotor 305 as retainer 320 containing coiled segmented vertical band 220. Retainer 330 is arranged substantially coplanar and concentric with retainer 320 at the expense of increasing the minimum radial diameter of the coiled retaining band 230. However, the coplanar arrangement of retainer 320 and retainer 330 allows sidewalls 303 to be shortened producing a more compact outer housing for holding the undeployed spiral column.

Retainer 320 may also be configured with a roller 321 which rotates and contacts segmented vertical band 220 as it is uncoiled and dispensed from the retainer 320. The roller 321 is configured with gear-like teeth spaced apart such that a group of non-tabbed segments (226, shown in FIG. 2B) are urged radially inward relative to the outermost diameter of horizontal band 210 edges. This causes the non-tabbed segments 226 to define a corrugated profile in the outer wall of the extendable column. In another embodiment, the roller 321 is not used, as the enmeshing of the upper tabs 224 and lower tabs 225 of successive turns of horizontal band 210 cause the non-tabbed segments 226 to be urged radially inward to form a corrugated profile in the vertical sidewall defined by segmented vertical band 220.

Referring to FIG. 4A, there is shown a diagrammatic elevation view of a spiral lift linear actuator 410 according to an embodiment of the disclosure. The linear actuator 410 is shown as a support member for a radar system such as the radar system shown in FIG. 1 with linear actuator 410 replacing the conventional hydraulic linear actuator (113). A base extension member 401 is attached at an end of base 103 and extends horizontally therefrom. Base extension member 401 provides an attachment point for compact self deploying actuator 410 at pivot joint 415. The self deploying actuator 410 includes a housing 405. Housing 405 is configured to contain the three elements or bands shown in FIGS. 2A-2C when not deployed. The three bands 210, 220, 230 cooperate to form a corrugated spiral column that exhibits strength and rigidity both axially and radially. The housing 405 is sufficiently compact to fit vertically within the space between the antenna array 109 and the base extension member 401. Conventional piston or telescoping actuators require minimum segment lengths that do not fit within the space between the antenna array 109 and the base extension member 201. According to an embodiment, the space between the antennar array 109 and the base extension member 201 may be about 24 inches.

Horizontal band 210 is contained within housing 405 when in. Horizontal band 210 is configured as a flat helical band when the actuator 410 is in a retracted state. The horizontal band 210 is arranged such that the major planar surfaces of the horizontal band 210 are substantially perpendicular to the longitudinal axis of the actuator 410 when it is extended or deployed. When deployed, the horizontal band 210 forms a horizontal shelf, which supports a vertical sidewall between each turn of the helix. Accordingly, throughout this specification, the terms "flat helical band", "horizontal band" and "horizontal shelf" are used interchangeably.

Also housed within housing 405 is segmented vertical band 220. In one embodiment, the segmented vertical band 220 is comprised of hinged segments, which allow the segmented vertical band 220 to be coiled and stowed within the housing when retracted. When deployed, the segmented vertical band 220 is positioned between separated successive turns of the helix formed by horizontal band 210. While being inserted between turns of the helix, the hinged segments (223, 226, shown in FIG. 2B) are arranged to form a corrugated sidewall.

Housing 405 further contains retaining band 230. This band 230 remains coiled in a spiral configuration when actuator 410 is in a retracted state. The retaining band 230 is dispensed as a helical band that surrounds the corrugated spiral column 420 formed by the horizontal band 210 and segmented sidewall 220. The retaining band 230 surrounds the spiral column 420 at junction points joining the edges of horizontal band 210 with the vertical ends of the segmented vertical band 220 segments.

The actuator 410 is pivotally attached to the antenna array 109 at pivot joint 413. Actuator 410 is adjustably positioned between pivot joints 413 and 415. As actuator 410 extends, antenna array 109 is raised to a deployed position via pivot point 107. Due to the relative positioning of the actuator 410 and pivot joints 413 and 415, antenna array 109 is lifted with only enough force needed to raise the array to the deployed position as indicated by force vector 123 shown in FIG. 1. As the antenna array 109 is raised, pivot joints 413 and 415 define end points that remain collinear with the center longitudinal axis of the linear actuator 410 as the spiral column 420 is extended or deployed.

Figure 4B:
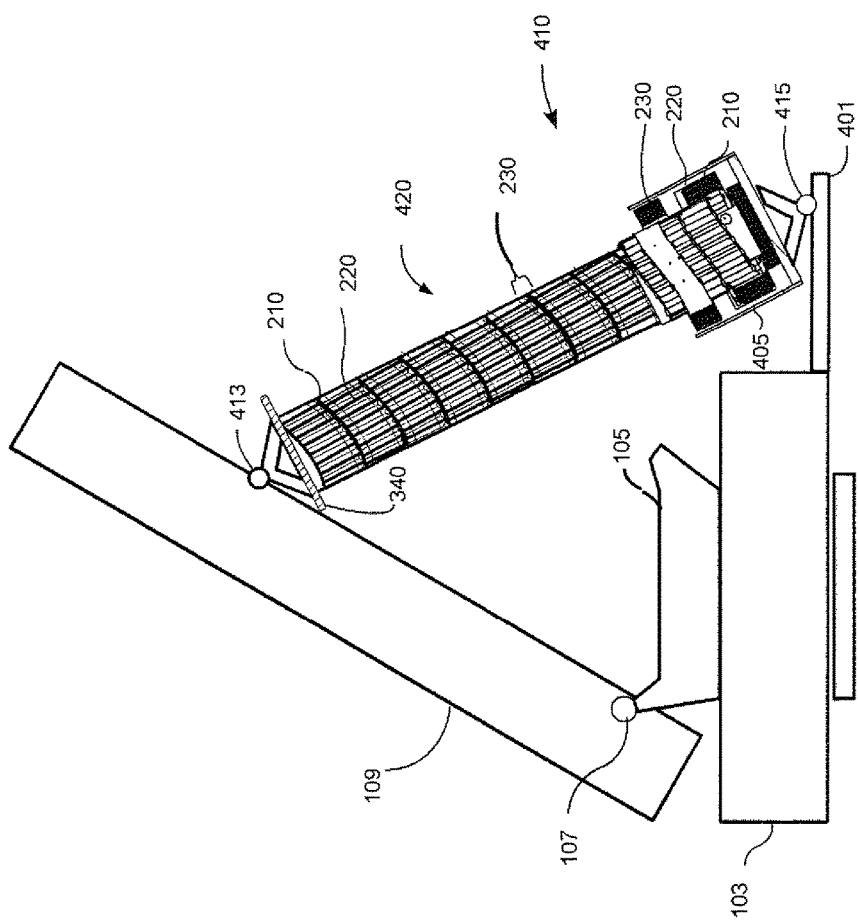
FIG. 4B is an elevation view of a radar system with a lift actuator according to an embodiment of the disclosure in a deployed position.

FIG. 4B is a diagrammatic elevation view of a compact self-deploying actuator 410 in a deployed state according to an embodiment of the disclosure. Actuator 410 is shown installed in a radar system for raising a planar radar antenna or antenna array 109. The antenna array 109 is configured to be stowed in a horizontal position atop mount 105 on base 103 when being transported or otherwise not in use. The antenna array 109 may be raised to an angular position by pivoting the antenna array 109 about pivot joint 107 at base 103.

The actuator 410 is positioned to be substantially in line with and below pivot joint 413, which pivotally connects the antenna array 109 with platform 340 at the upper of extendable corrugated spiral column 420. Spiral column 420 extends from the housing 405 of the actuator 410 when actuator 410 is deployed. The spiral column 420 is defined by the interposition of horizontal band 210, segmented vertical band 220 and retaining band 230. Due to the actuator 410 housing 405 being connected to the base extension member 401 at pivot joint 415 and the antenna array 109 by pivot joint 413 the actuator 410 acts as a two-force member. As such, actuator 410 must be able to support both tensile and compressive loads.

Figure 5:
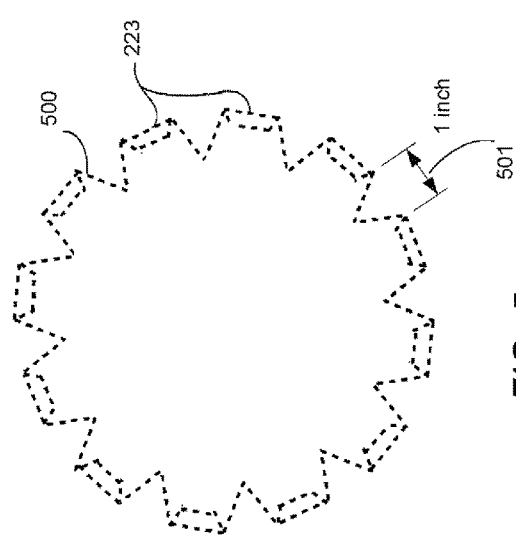
FIG. 5 is a cross sectional view of a corrugated cylinder structure according to an embodiment of the present disclosure.

An exemplary corrugated cross-sectional profile is shown in FIG. 5. Tabbed segments 223 are arranged tangent to the horizontal band 210 and define a vertical wall about the perimeter of the edge of horizontal band 210. Tabs 224, 225 overlap and engage the edge of the horizontal band 210. The tabs overlap and bend inward relative to the horizontal band 210 to position the tabbed segments 223 vertically between turns of the horizontal band 210. Tabs 224, 225 may be offset from the planar surface of tabbed segment 223 at an angle, which compensates for tolerance buildups in the material build of the segmented sidewall. According to an embodiment, tabs 224, 225 are offset by an angle of about 45° which allows the segmented vertical band 220 to be coiled without the protruding tabs 224, 225 from interfering with one another as the segmented vertical band 220 is coiled. A retaining band 230 is also coiled and contained within actuator housing 405. Retaining band 230 is wrapped around the corrugated spiral column 420 as the column is extended from housing 405 during deployment.

The retaining band 230 forms a helical band that covers regions of corrugated spiral column 420 where the tabbed segments 223 of the vertical sidewall engage the edges of the turns of horizontal band 210. Thus, the retaining band 230 wraps around the spiral column 420 and overlaps the seam created where an upper set of tabbed segments 223 meets a lower set of tabbed segments 223 at an edge of the horizontal band 210 and applies a radial load to pinch the segments against the outer diameter of the horizontal band 210. The retaining band 230 exerts inward pressure to resist sliding or movement of the vertical wall with respect to the horizontal band 210. The retaining band 230 may be guided and maintained in position by embossed ridges (331, shown in FIG. 3B) or bumps (e.g. bosses) defined in the surfaces of the tabbed segments 223 in segmented sidewall that engage with apertures and/or slots (333, shown in FIG. 3B) in the retaining band 230. The resulting corrugated column 420 results in a rigid column, which resists both compressive and lateral forces. The rigid corrugated spiral column 420 may be used to lift antenna array 109 into a deployed position, and provides sufficient rigidity to resist lateral forces, for example due to wind, so that conventional stay braces are not required to stabilize the deployed antenna array 109.

While the corrugated columnar structure is described within the scope of a linear actuator for deploying a radar antenna array, other uses for a linear actuating device may be conceived which also fall within the scope of this disclosure. For example, a scissor-type lift for providing an elevated platform for holding persons or other loads may utilize the self deploying corrugated spiral lift described herein. Vehicle lift jacks could be replaced with the deployable corrugated spiral column described herein. One or more corrugated spiral columns such as described herein could be used as adjustable feet for an apparatus or supports for a platform. The columns may be deployed in unison or individually to provide support and leveling as needed. Other uses may be contemplated which fall within the intended scope of this disclosure.

FIG. 5 is an illustration of a cross section of a corrugated spiral column according to an embodiment of the disclosure. A quick check for calculating the material thickness required may be determined as illustrated in the following non-limiting example and equations. Assume that the maximum axial load P that needs to be supported is 13,000 pounds (lbs). The cross-sectional area of the actuator sidewall may be calculated as the length of perimeter 500, L, multiplied by the thickness of the sidewall, (Thk). Therefore, the cross sectional area is given as A=L*Thk. For a steel sidewall, the allowable stress of steel is taken to be $\sigma_{allow}$=36,000 psi. Therefore, the required thickness in this example for a perimeter length of 30 inches may be solved for according to:

$$\sigma_{allow} = 36{,}000 \frac{\text{lb}}{\text{in}^2} = \frac{P}{A} = \frac{13{,}000 \text{ lb}}{30 \text{ in} * Thk} \qquad \text{Equation (1)}$$

solving for Thk, $$Thk = \frac{13{,}000}{30 * 36{,}000} = 0.012 \text{ in} \qquad \text{Equation (2)}$$

Based on the above, a corrugated column may be formed which supports a 13,000 pound axial load with a thickness of only 0.012 inches. The example above is provided for illustrative purposes only, it is understood that the values used therein are based on assumptions for a particular circumstance. Those assumptions may change based on a particular application being considered.

The cross section shown in FIG. 5 may be implemented to include corrugations defining a gap 501 of about one inch between tabbed sidewall segments 223. The sidewall segments 503 may further define tabs 224, 225 (shown in FIG. 2B) that engage the horizontal band 210 as described above with respect to FIGS. 2A-2B.

Figure 6A:
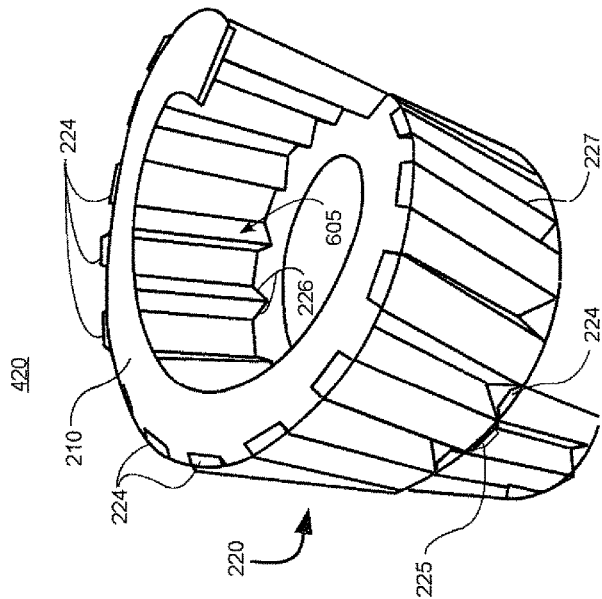
FIGS. 6A and 6B show perspective views of a partial section of a spiral corrugated column according to an embodiment of the disclosure.
Figure 6B:
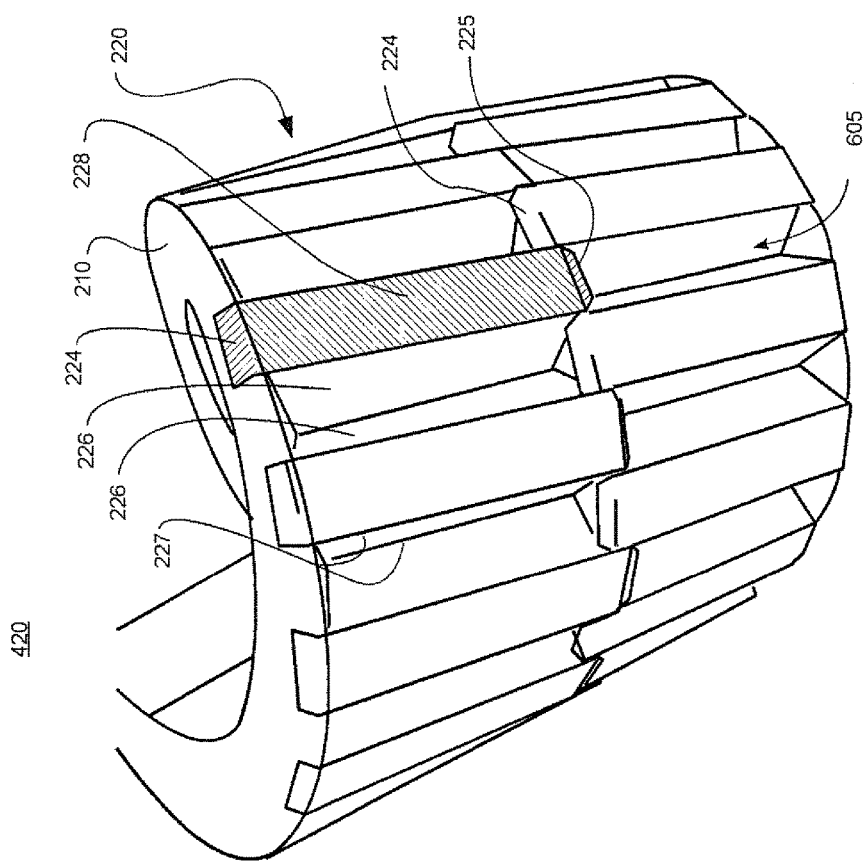

FIGS. 6A and 6B are perspective views of a section of a corrugated spiral column 420 according to an embodiment of the disclosure. Horizontal band 210 is shown with vertical sidewall 220 inserted between the turns of horizontal band 210. The vertical sidewall includes segments 223 having tabs 224 arranged at an upper edge of segment 223 and tabs 225 arranged at a lower edge of the segment 223. Tabs 224, 225 overlap and engage the edges of horizontal band 210. For each successive turn of the horizontal band 210, the tabbed vertical sidewall segments 223 are configured to be offset with respect to adjacent turns of the horizontal band 210. In this way, the lower tabs 225 of a first vertical wall section 601 overlap and engage the edge of horizontal band 210 from above, while the upper tabs 224 of a second vertical wall section 603 engage the edge of the horizontal band 210 from below at positions that fall between the lower tabs 225 of the first vertical wall section 601.

In addition to the tabbed segments 223 of the vertical sidewall, non-tabbed wall segments 226 are located between adjacent tabbed segments 223. Each adjacent wall segment 223, 226 is joined at hinged edges 227. Hinged edges 227 allow non-tabbed segments 226 to be angled with respect to each other to form corrugations 605 between tabbed segments 223. During deployment, the segmented vertical band 220 is extended as it is dispensed from actuator housing 405. A gear-like roller 321 may be used to guide the segments 226 into a corrugated configuration as the vertical sidewall is dispensed. The alternating upper tabs 224 and lower tabs 225 operate similarly to enmeshed teeth of a gear to align the tabs 224, 225 with the edge of the horizontal band 210 and to urge the hinged segments 226 inward to form corrugations 605 between the tabbed segments 223.

FIG. 7A and FIG. 7B are plan views of the segmented vertical sidewall 609. FIG. 7A shows the segmented vertical sidewall in an undeployed configuration. Segment 223 includes tabs 224, which engage the horizontal helical band when the actuator column is deployed. Segments 226 are arranged between adjacent tabbed segments 223. Each adjacent segment 223, 226 is coupled at a hinged edge 227. Hinged edges 227 allow the segments 223, 226 to be positioned coplanar as shown in FIG. 7A, and allow the segmented vertical sidewall 609 to be coiled for storage within actuator housing 405.

FIG. 7B shows the segmented vertical sidewall in a deployed or corrugated configuration. Tabbed segments 223 are arranged about the circumference of the corrugated spiral column (420, shown in FIG. 4B) having tabs 224, which overlap and engage the edges of horizontal band 210 (FIG. 2A). The tabbed segments 223 are arranged about the horizontal band 210 so that the tabbed segments 223 of a first section of vertical sidewall associated with a first turn of the horizontal band 210 from above are offset with respect to tabs of a second section of vertical sidewall associated with the first turn of horizontal band 210 from below. The offset tabs from the first and second sections of vertical sidewall thereby enmesh like teeth of a gear interlocking the tabs associated with the second section of vertical sidewall with tabs of the first section of vertical sidewall. Segments 223, 226 are connected at hinged edge 277 and are urged inward at an angle by the interspersion of tabs 224 to form corrugations between adjacent tabbed segments 223 as shown in FIG. 7B.

Figure 8:
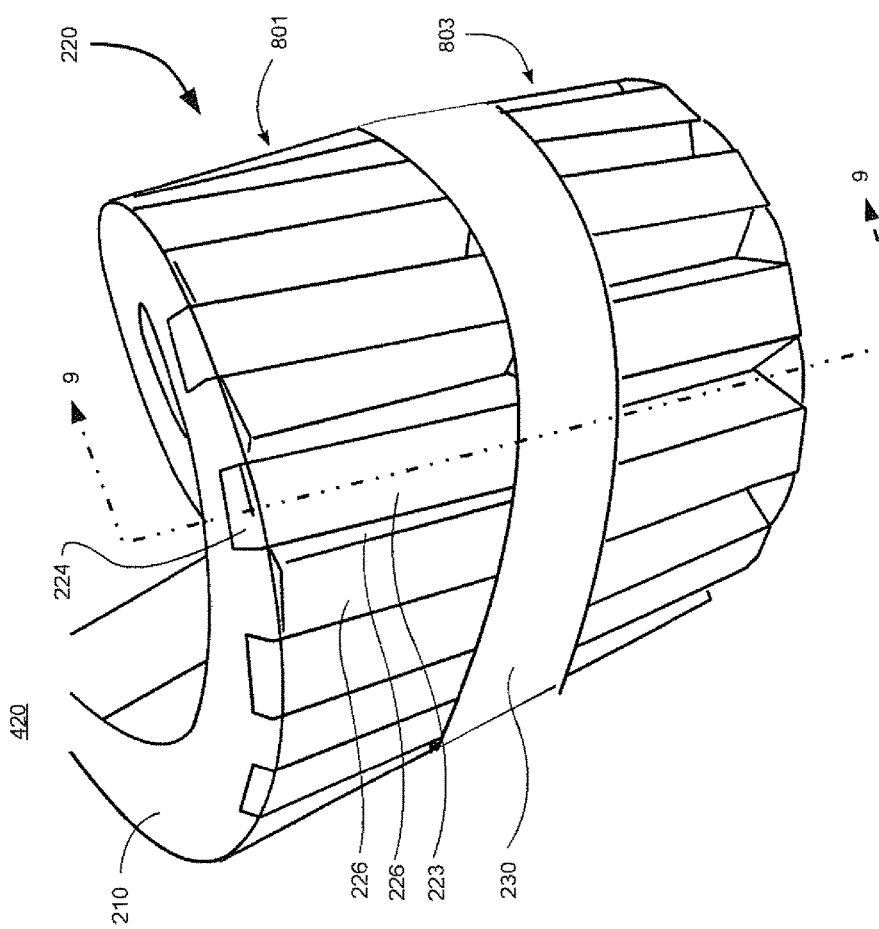
FIG. 8 is a perspective view of the spiral corrugated column of FIG. 4B illustrating a vertical sidewall segment having interlocking tabs and a retaining band according to an embodiment of the disclosure.

FIG. 8 is a perspective view of a portion of the corrugated spiral column 420 including a retaining band 230 according to an embodiment of the disclosure. Retaining band 230 wraps around the corrugated spiral column 420 and follows the outer edge of the horizontal band 210. The retaining band 230 surrounds the tabs 225 extending from the lower end of tabbed segments 223 and tabs 224 extending from the upper ends of tabbed segments 223 of second section 803 of vertical sidewall 220. The retaining band 230 ensures the tabs 224, 225 remain interlocked when the corrugated spiral column 420 is extended. The retaining band 230 is a resilient band, which is in a spiral configuration that is stretched to extend to the diameter of the corrugated spiral column 420. The retaining band 230 hugs the outside of the corrugated column 420 and serves to hold the tabs of the tabbed vertical wall segments 223 against the outer rim of the horizontal band 210. The tension from the retaining band 230 interlocks the tabs of tabbed segments 223 and horizontal band 210 to form a rigid, corrugated column capable of withstanding severe compressive, tensile and lateral forces. In the example shown in FIG. 4B wherein a radar antenna is raised into position by corrugated spiral column 420, as the spiral column 420 extends and the antenna array 109 is raised, the angle changes from nearly horizontal to some angle of inclination relative to ground level. The retaining band 230 ensures that the horizontal band 210 and the corrugated vertical sidewall remain securely engaged to provide adequate structural integrity of the spiral column 420. Conventional dual element spiral lifts having only a horizontal band and vertical band cannot withstand the lateral forces applied by the weight of the column and gravity as the column is tilted. Therefore, their use is limited to primarily compressive loads in the absence of outside forces such as wind or uneven surfaces which introduce additional lateral loads that cause the spiral sidewalls to sag and unwind, thereby becoming disengaged from the horizontal element and compromising the structural integrity of the column.

Figure 9:
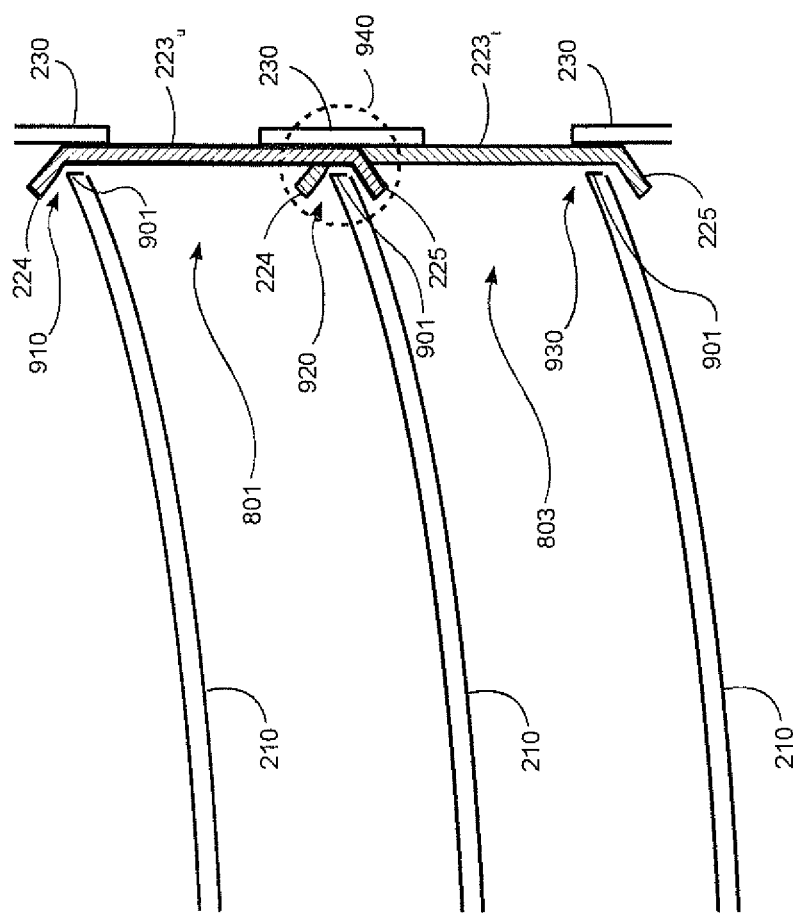
FIG. 9 is a sectional view of a spiral corrugated column according to an embodiment of the disclosure illustrating a three-element columnar structure.

FIG. 9 is a cross sectional view of the corrugated spiral column of FIG. 8 along line 9-9. Horizontal band 210 is shown with three turns of the helix being visible. The outer edge 901 of the horizontal band 210 is overlapped on its outer edge by tabs 224, which extend from an upper end of tabbed vertical segment 223 of segmented vertical sidewall. Tabbed vertical segment denoted $223_u$ corresponds to an upper first region of vertical sidewall. Tabbed vertical segment $223_u$ includes an upper tab 224, which overlaps and engages the edge of the uppermost turn of horizontal band 210 at point 910. Tabbed vertical segment $223_u$ also includes lower tab 225, which overlaps and engages the edge of horizontal band 210 at point 920. A second lower tabbed vertical segment $223_l$ includes an upper tab 224, which overlaps and engages the edge of horizontal band 210 at point 920 and a lower tab 225, which overlaps and engages the edge of horizontal band 210 at point 930.

As may be seen in FIG. 9, the lower tab 225 of vertical sidewall segment $223u$ engages the edge of horizontal band 210 at point 920 from above, with the upper tab of vertical sidewall segment $223l$ engaging the edge of horizontal band 210 from below. Lower tab 225 of vertical sidewall segment $223u$ and upper tab 224 of vertical sidewall segment $223l$ are offset along the edge of horizontal band 210 and intermesh like teeth of a gear. In addition, the respective angles of upper tab 224 and lower tab 225 relative to their vertical segment 223 form a v-shaped channel in the area highlighted as 940. The v-shaped channel 940 receives edge 901 of horizontal band 210. The flared angle of v-shaped channel 940 provides a tolerance for engaging the vertical sidewall 220 with the horizontal band 210 during deployment of the actuator. Retaining band 230 surrounds the corrugated spiral column covering the v-shaped channel 940 and the edge 901 of horizontal band 210. Retaining band 230 prevents movement of the tabbed vertical segments 605 and maintains the relative positioning between the edge 801 of horizontal band 210 and v-shaped channel 940 securely engaged.

Figure 10:
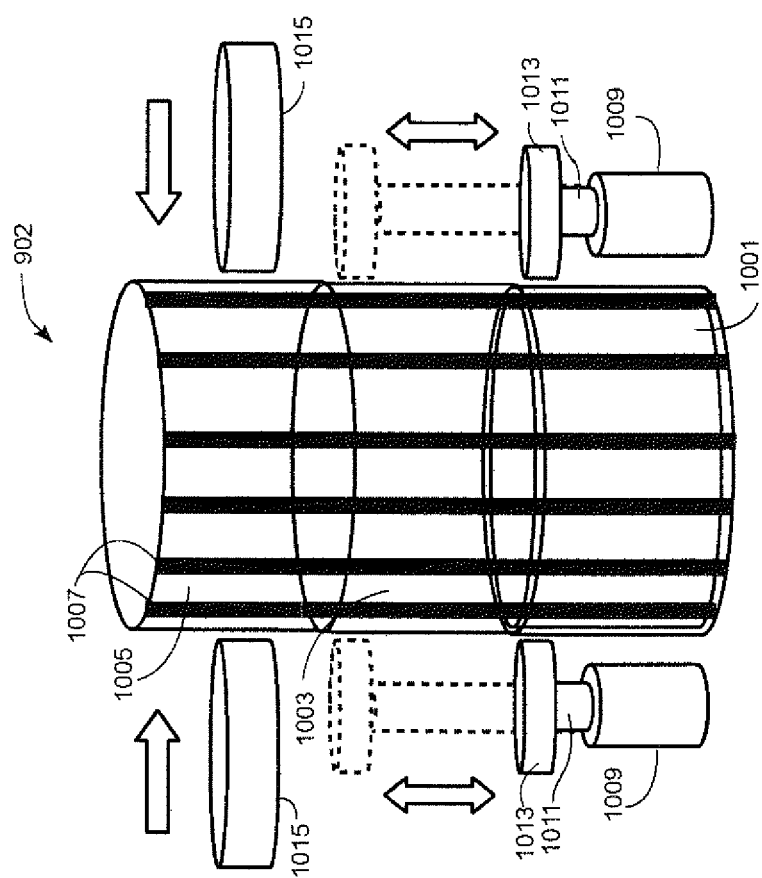
FIG. 10 is a perspective diagrammatic view of a telescoping corrugated column according to an embodiment of the disclosure.

FIG. 10 is a perspective view of a telescoping corrugated column lift according to an embodiment of the disclosure. Corrugated column 1002 comprises a plurality of corrugated segments 1001, 1003, 1005. The perimeters of the segments 1001, 1003, 1005 are defined by corrugations 1007 which increases the cross sectional surface area of the overall column 1002 wall and thereby increases the strength and rigidity of column 1002.

Corrugated segments 1001, 1003, 1005 nest inside one another in a telescoping configuration when corrugated column 1002 is not deployed (i.e. in an undeployed state). Corrugated segment 1005 is configured with an internal diameter that is larger than the outside diameter of corrugated segment 1003. Corrugated segment 1003 is configured with an internal diameter that is larger than the outside diameter of corrugated segment 1001. As the telescoping column 1002 is collapsed, corrugated segment 1005 will lower and surround corrugated segment 1003. As corrugated segment 1003 is lowered, segment 903 surrounds corrugated segment 1001. When fully collapsed, segments 1001, 1003, and 1005 are at substantially the same vertical level (height), with the columnar segments being concentric. Corrugated segment 1001 defines the innermost segment and is surrounded by corrugated segment 1003, which is further surrounded by corrugated segment 1005.

To deploy corrugated column 1002, at least one indexing actuator 1009 is positioned adjacent to the corrugated column 1002. Each actuator 1009 includes a pinch roller 1013, which is moveable laterally to frictionally engage the outermost corrugated segment at the lowermost segment level, shown as segment 1001 in FIG. 10. Actuator 1009 further includes a piston 1011 coupled to pinch roller 1013 and configured to move the pinch roller 1013 vertically and push the outermost corrugated segment upward (i.e. vertically). Clamps 1015 are configured to move transversely to the longitudinal axis of corrugated column 1002 and to contact a corrugated segment raised by actuators 1009. Clamps 1015 exert sufficient friction to maintain the raised segment in its extended position. Actuators 1009 may continue to raise subsequent corrugated segments until a desired or target height of corrugated column 1002 is achieved. To retract the corrugated column, clamps 1015 are moved outward to release the uppermost corrugated segment, and actuators 1009 are configured to contact the penultimate corrugated segment and lower the segment to the lowermost or storage position.

Figure 11:
FIG. 11 is a table comparing weight and stiffness of corrugated and flat panels.

FIG. 11 shows a table comparing the stiffness of corrugated and flat panels. A corrugated panel designated RS-7.2 has a corrugated cross-section 1101 when placed under a load of 0.1 pounds per square inch (lb/in$^2$). The corrugated material has a thickness of 0.029 inches and exhibits a deflection of 0.038 inches. The corrugated material weighs 1.65 pounds per square foot (lb/ft$^2$). A second corrugated configuration is identified as 2.67×½ sine and has a sinusoidal cross sectional profile 1103. At a material thickness of 0.029 inches under a load of 0.1 lb/in$^2$, the 2.67×½ the corrugated panel exhibits a deflection of 0.083 inches and weighs 1.51 lb/ft$^2$. For comparison, three flat panels having a cross sectional profile 1105 and varying thickness of 0.074 inches, 0.104 inches, and 0.149 inches are shown. When exposed to the same load of 0.1 lb/in$^2$, the flat panels deflect at 0.459 inches, 0.165 inches, and 0.055 inches, respectively. The flat panels also weigh more than their corrugated counterparts, weighing 3 lb/ft$^2$, 4.34 lb/ft$^2$ and 6.1 lb/ft$^2$, respectively. As may be seen by the information contained in the table of FIG. 11, using a corrugated material provides weight reduction with increased load support. Using corrugated thin wall structures improves the stiffness of the material by a factor of 12, while reducing the required thickness of the material by a factor of 2.55.

Referring now to FIG. 12 a table comparing the deflection of various columnar supports under a lateral load is shown. The table of FIG. 12 shows the lateral deflection for columns of varying wall thicknesses. In the first data row, information relating to a conventional aluminum backstay (Model TPS-59) is shown. The backstay has a columnar wall having a wall thickness of 0.25 inches. Under a unit lateral force of 1.0 lbs. the backstay displays a deflection of 0.0028 inches. In the second data row a circular tube having flat steel panel surface exhibits deflection of 0.0038 inches under the same applied force. In the bottommost row, a corrugated steel tube having a wall thickness of 0.06 inches produces a lateral deflection of only 0.0016 under similar loading conditions. As may be seen, a comparable steel tube using a flat panel steel skin produces 2.375 times more deflection than a corrugated tube of the same wall thickness. Likewise, the aluminum backstay experiences 1.75 times the deflection of the corrugated steel tube.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A linear actuator comprising:
   an extendable column comprising:
   a first annular helical band configured about a central axis with turns of said helical band being transversely normal to said central axis, said first annular helical band being stored in a stacked configuration when said extendable column is in a non-deployed state, and successive turns of said first annular helical band being spaced apart from one another in a deployed state; and
   a second spiral coil band transversely parallel to said central axis and comprising a plurality of hinged segments, said spiral coil band being wound on itself in a non-deployed state and forming a helical tube in a deployed stated, turns of said helical tube cooperating with spaced turns of said first annular helical band to form the extendable column, said plurality of hinged segments including a plurality of tabbed segments having a tab extending from each longitudinal end of said tabbed segment; and at least two non-tabbed segments disposed between adjacent tabbed segments, said tabbed segments configured to span the space between successive turns of the first annular helical band with said tabs overlapping the outermost edges of said first annular band and said at least two non-tabbed segments being angled with respect to each other and to said adjacent tabbed segments, the hinge between said at least two non-tabbed segments being directed inward toward said central axis to define a corrugated profile in a side wall of said extendable column defined by said second band.

2. The linear actuator of claim 1, further comprising:
a housing configured to store said first annular band and said second band when said extendable column is in a non-deployed state, said first band and said second band being stored concentrically about said central axis, wherein said second band is stored as a spiral coil having a minimum radial diameter that is greater than a maximum radial diameter of said first band.

3. The linear actuator of claim 2, wherein said housing comprises:
a base;
at least one sidewall abutting said base;
a rotor having a cylindrical body, said rotor configured to rotate relative to said base, said cylindrical body having a maximum radial diameter which is shorter than the minimum radial diameter of said first annular band, wherein said first annular band is capable of resting on said base when stacked such that said turns of said first annular band surround said cylindrical body, said cylindrical body having a plurality of rollers disposed on the outer surface of said cylindrical body, said plurality of rollers positioned such that the upper surfaces of said plurality of rollers define an inclined path for supporting a turn of said first annular band, wherein rotation of said rotor relative to said first annular band causes successive turns of said first annular helical band to be spaced apart from one another as said supported turn transverses said inclined path.

4. The linear actuator of claim 3, further comprising:
a retainer rotatably mounted to said rotor and configured to rotatably surround said rotor and to contain said second band when configured as a spiral coil, wherein relative motion between said rotor and said retainer causes an end of said spiral coil to position said hinged segments relative to said separated successive turns of said first annular band, to form said extendable column.

5. The linear actuator of claim 1, wherein each of said tabbed segments of said second band comprise a first tab positioned at an angle relative to a planar face of said tabbed segment at a first longitudinal end of said segment, and a second tab positioned at said angle relative to said planar face of said tabbed segment, such that when said spiral coil is wound upon itself said first and second tabs do not interfere with tabs of other tabbed segments in said spiral coil.

6. The linear actuator of claim 5, wherein said first and second tabs are arranged at an angle of about 45° relative to said planar face of said tabbed segment, said first and second tabs being directed in an inward direction toward said central axis.

7. The linear actuator of claim 1, wherein said at least two non-tabbed segment have a longitudinal dimension that is shorter than the space between successive turns of said first annular helical band thereby allowing said non-tabbed segments to fit between said successive turns of said first annular helical band.

8. The linear actuator of claim 1, further comprising:
a third retaining band configured to wrap around said extendable column when deployed, said third retaining band covering an edge of said first annular band where said tabs of said tabbed segments overlap said outermost edge of said first annular helical band.

9. The linear actuator of claim 8, wherein said third retaining band comprises a resilient material.

10. The linear actuator of claim 9, wherein said vertical retaining band comprises one of a synthetic strap and a wire rope.

11. The linear actuator of claim 8, wherein each of said tabbed segments comprises at least one boss and said retaining band comprises a plurality of apertures configured to receive and engage said at least one boss.

12. The linear actuator of claim 8, wherein each of said tabbed segments comprises an embossed ridge configured to guide the positioning of said third retaining band.

\* \* \* \* \*